United States Patent
Kao

(10) Patent No.: US 10,703,434 B2
(45) Date of Patent: Jul. 7, 2020

(54) CYCLING SHOE FIXING DEVICE

(71) Applicant: Bryan Weiluen Kao, Taichung (TW)

(72) Inventor: Bryan Weiluen Kao, Taichung (TW)

( * ) Notice: Subject to any disclaimer, the term of this patent is extended or adjusted under 35 U.S.C. 154(b) by 249 days.

(21) Appl. No.: 16/028,444

(22) Filed: Jul. 6, 2018

(65) Prior Publication Data
US 2020/0010143 A1    Jan. 9, 2020

(51) Int. Cl.
| | |
|---|---|
| *B62M 3/16* | (2006.01) |
| *B62M 3/08* | (2006.01) |
| *B62L 3/02* | (2006.01) |
| *B62J 99/00* | (2020.01) |
| *B62K 21/12* | (2006.01) |
| *B62J 45/40* | (2020.01) |

(52) U.S. Cl.
CPC ............... *B62M 3/16* (2013.01); *B62J 99/00* (2013.01); *B62K 21/12* (2013.01); *B62L 3/02* (2013.01); *B62M 3/086* (2013.01); *B62J 45/40* (2020.02)

(58) Field of Classification Search
CPC ............. B62M 3/086; B62M 3/08; B62L 3/02
See application file for complete search history.

(56) References Cited

U.S. PATENT DOCUMENTS

| | | | | |
|---|---|---|---|---|
| 4,819,504 A * | 4/1989 | Sampson | ............... | B62M 3/086 74/594.4 |
| 4,898,048 A * | 2/1990 | Sampson | ............... | B62M 3/086 74/594.4 |
| 4,898,063 A * | 2/1990 | Sampson | ............... | B62M 3/086 36/131 |
| 4,969,373 A * | 11/1990 | Good | ................. | B62M 3/083 188/24.11 |
| 5,211,076 A * | 5/1993 | Baume | ............... | B62M 3/086 36/131 |
| 7,017,445 B2 * | 3/2006 | Bryne | ............... | B62M 3/086 74/560 |

* cited by examiner

*Primary Examiner* — Jacob D Knutson
*Assistant Examiner* — Michael R Stabley
(74) *Attorney, Agent, or Firm* — Wang Law Firm, Inc.

(57) ABSTRACT

A cycling shoe fixing device and a bicycle are provided. The cycling shoe fixing device includes a brake sensing module, a cycling shoe releasing module and a power supply module. The brake sensing module is disposed inside a brake handle of the bicycle. The brake sensor of the brake sensing module can sense the braking action of the brake handle to generate a sensing signal. The cycling shoe releasing module is disposed inside the pedal module of the bicycle. Upon receipt of the sensing signal, a driving unit can drive the engagement unit according to the sensing signal, to make the cycling shoes separable from the pedal module. With the configuration, the cycling shoes can be released automatically in response to subconscious action, to prevent from risk that the rider takes off the cycling shoes too late.

6 Claims, 4 Drawing Sheets

CYCLING SHOE FIXING DEVICE

BACKGROUND OF THE INVENTION

1. Field of the Invention

The present invention generally relates to the field of bicycles, more particularly to a cycling shoe fixing device which is able to automatically release cycling shoes in response to the user's subconscious action, and a bicycle using this cycling shoe fixing device.

2. Description of the Related Art

When riding a road bike or a mountain bike, a rider may wear a cycling shoe on their feet and modify the general pedal to a clipless pedal which can be fixed to the cycling shoe. The cycling shoe and clipless pedal can be engaged and locked with each other, so the rider's foot can pedal with force more stably without slipping. When one of the feet is lifted, the cycling shoe is not separated from the clipless pedal engaged therewith and is also pulled back to drive another conventional pedal, so that the rider's foot can be always maintained on the modified pedal, thereby allowing the stepping force to be more uniform.

The pedal used for fixing the cycling shoe is also called as a clipless pedal, and mainly utilizes an elastic engagement structure in which an elastic member is used to open a fastener to expose a fixing slot and then the spike of the cycling shoe can be inserted into the fixing slot, and the fixing member is then closed by the elastic member, thereby engaging the spike to achieve the effect of fixing the conventional cycling shoe on the clipless pedal.

The cycling shoe can be fixed to the clipless pedal to prevent accidental disengagement and allow the stepping force to be more uniform. However, when the rider wants to stop, the rider must separate the cycling shoe from the clipless pedal by a special action, for example, the user must quickly rotate the foot in a predetermined direction and then move away the clipless pedal. Generally, this disengagement action is very different from the rider's general habits or reflective actions. For this reason, the rider must practice for many times to separate the cycling shoes and the clipless pedal before being skilled. Furthermore, the rider may encounter various kinds of unexpected situations or emergencies when riding, and even for a professional rider, in case of an emergency, it may be too late to separate the cycling shoe from the clipless pedal, and it may result in serious accident.

SUMMARY OF THE INVENTION

In order to solve aforementioned technical problems, the present invention provides a cycling shoe fixing device and a bicycle using the same. The cycling shoes can be released automatically in response to the rider's subconscious action, so as to prevent from the risk that the rider may take the cycling shoe off clipless pedal too late.

According to an embodiment, the present invention provides a cycling shoe fixing device applicable to a bicycle. The cycling shoe fixing device comprises a brake sensing module, a cycling shoe releasing module, and a power supply module. The brake sensing module is disposed inside a brake handle of the bicycle, and comprises a brake sensor and a first wireless transmitter. The brake sensor is configured to sense a braking action of the brake handle to generate and transmit a sensing signal to the first wireless transmitter, and the first wireless transmitter is configured to transmit the sensing signal. The cycling shoe releasing module is disposed inside a pedal module of the bicycle. The pedal module corresponds to a pair of cycling shoes used by a user, and the cycling shoe releasing module comprises a driving unit and a second wireless transmitter, the second wireless transmitter is configured to receive the sensing signal, and transmit the sensing signal to the driving unit, and the driving unit is connected to an engagement unit of the pedal module, and configured to drive the engagement unit to a release location according to the sensing signal, so as to make the cycling shoes separable from the pedal module. The power supply module is electrically connected to the brake sensor, the first wireless transmitter, the driving unit, and the second wireless transmitter, and configured to supply power to the brake sensor, the first wireless transmitter, the driving unit and the second wireless transmitter for operation.

Preferably, the power supply module comprises a first battery unit disposed inside the brake handle of the bicycle and electrically connected to the brake sensor and the first wireless transmitter.

Preferably, the power supply module comprises a second battery unit disposed inside the pedal module of the bicycle and electrically connect the driving unit and the second wireless transmitter.

According to an embodiment, the present invention provides a bicycle comprising a handlebar, a brake module, a pedal module, and a power supply module. The handlebar is configured to provide a rider to control the bicycle to move straight or turn. The brake module comprises two brake handles and at least one brake sensing module. The two brake handles are configured to stop or slow rotations of two wheels of the bicycle, respectively, and the at least one brake sensing module is disposed inside the at least one brake handle, the brake sensing module comprises a brake sensor and a first wireless transmitter, and the brake sensor is configured to sense a braking action of the brake handle to generate and transmit a sensing signal to the first wireless transmitter, and the first wireless transmitter is configured to transmit the sensing signal. The pedal module is driven by a rider's stepping action to rotate the two wheels of the bicycle, and the pedal module corresponds to a cycling shoe used by a rider, comprises a pedal, an engagement unit and a cycling shoe releasing module, the cycling shoe releasing module is disposed inside the pedal of the bicycle, the engagement unit is disposed on the pedal and configured to engage or release the cycling shoe, and the cycling shoe releasing module comprises a driving unit and a second wireless transmitter, and the second wireless transmitter is configured to receive the sensing signal, and transmit the sensing signal to the driving unit, and the driving unit is connected to the engagement unit of the pedal module, and configured to drive the engagement unit to a release location according to the sensing signal, so as to make the cycling shoes separable from the pedal. The power supply module is electrically connected to the brake sensor and the first wireless transmitter, the driving unit, and the second wireless transmitter, and configured to supply power to the brake sensor, the first wireless transmitter, the driving unit, and second wireless transmitter for operation.

Preferably, the power supply module comprises a first battery unit disposed inside the brake handle of the bicycle and electrically connected to the brake sensor and the first wireless transmitter.

Preferably, the power supply module comprises a second battery unit disposed inside a pedal module of the bicycle and electrically connected to the driving unit and the second wireless transmitter.

According to above-mentioned contents, the cycling shoe fixing device and the bicycle of the present invention can integrate the brake sensing module into the brake device of the bicycle, and when the brake device is pressed, the cycling shoe fixing device can automatically transmit sensing signal, transmit without inputting signal manually, even when the rider is unable to output the signal autonomously during riding. Furthermore, the user's subconscious action of pressing the brake for stopping bicycle is used to automatically release the cycling shoe, so as to prevent from risk that the rider may take the cycling shoe off the clipless pedal too late.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
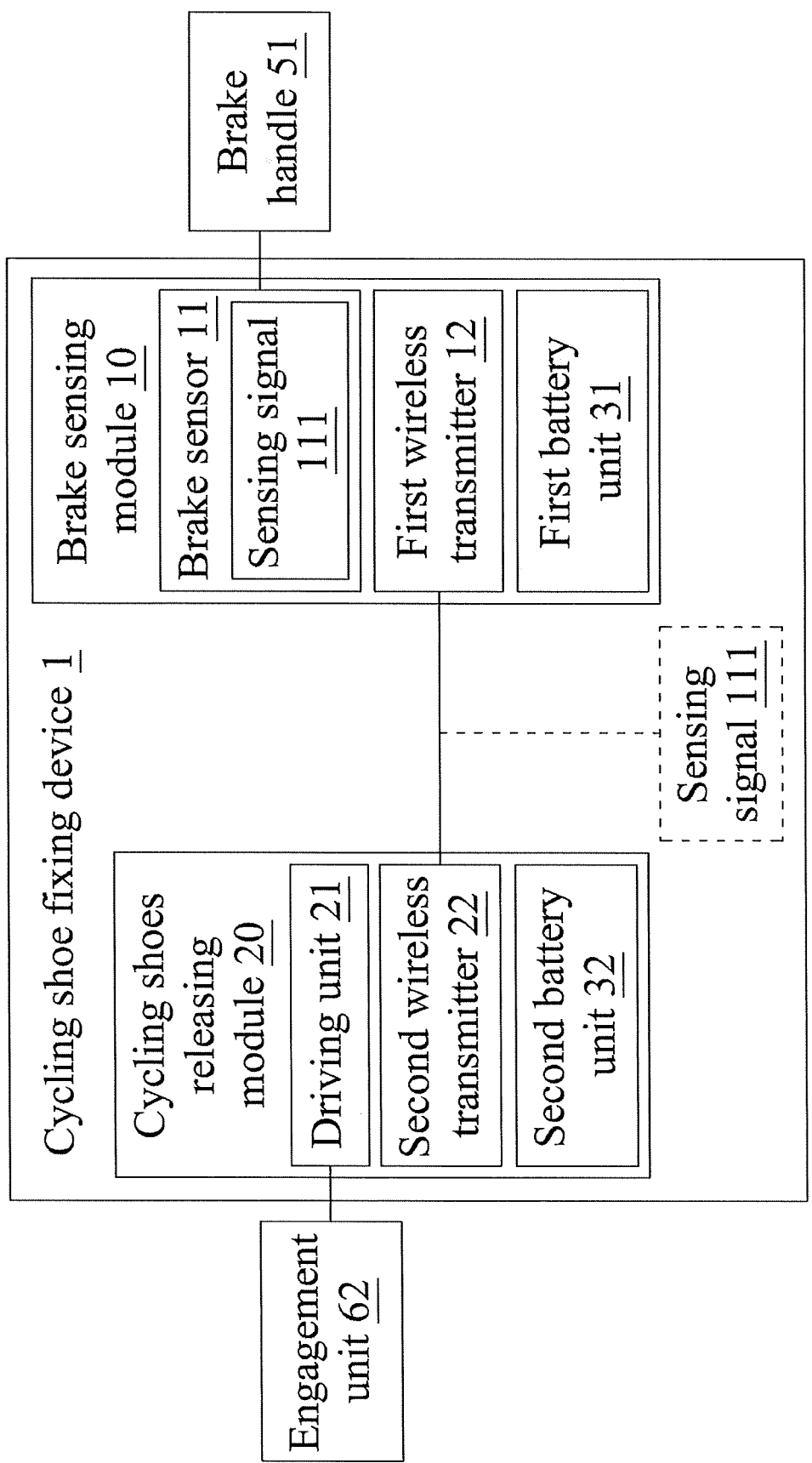
FIG. 1 is a block diagram of a cycling shoe fixing device of an embodiment of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Figure 2:
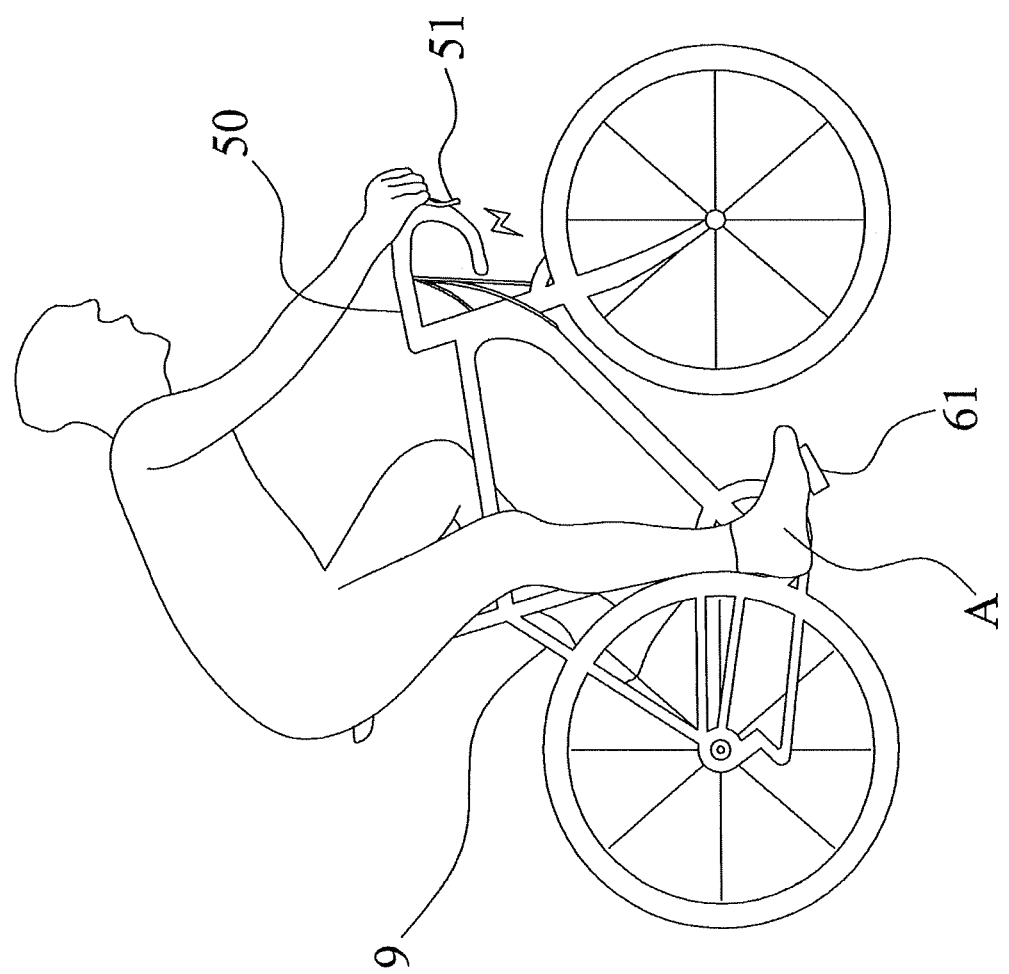
FIG. 2 is a schematic view of an operation of a cycling shoe fixing device of an embodiment of the present invention.
Figure 3:
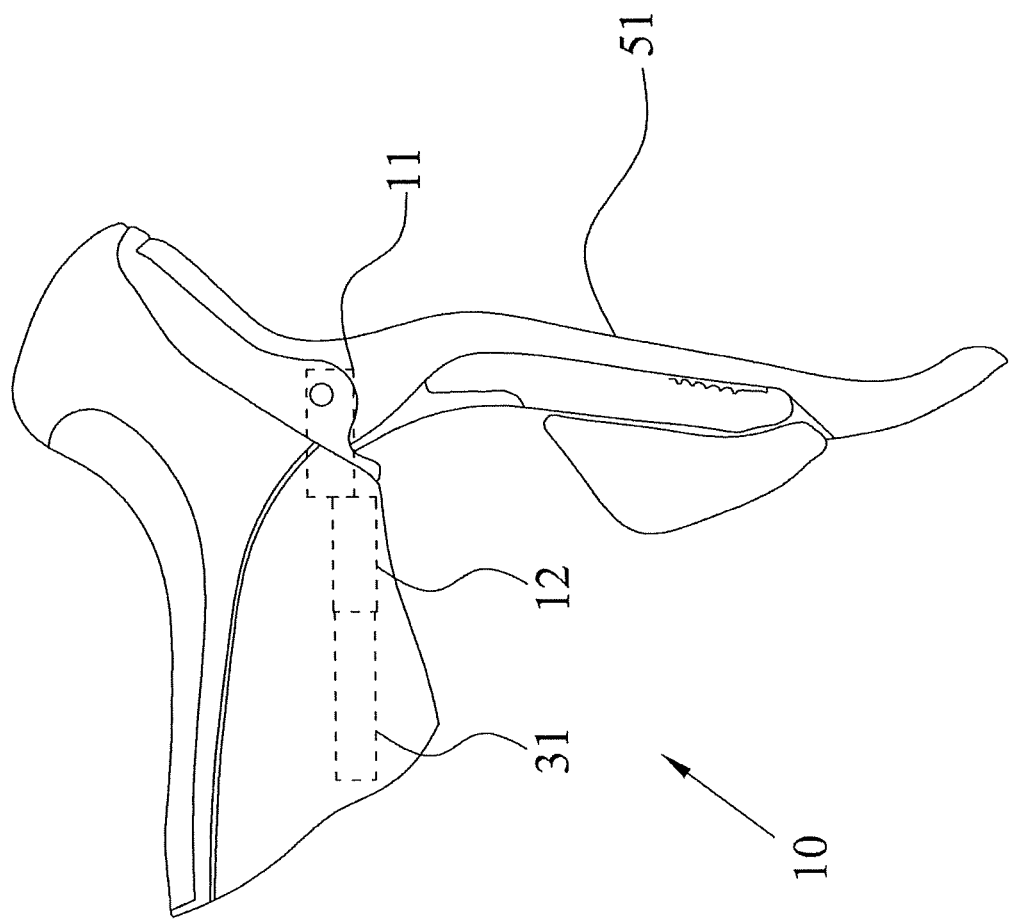
FIG. 3 is a schematic structural view of a brake sensing module of a cycling shoe fixing device of the present invention.
Figure 4:
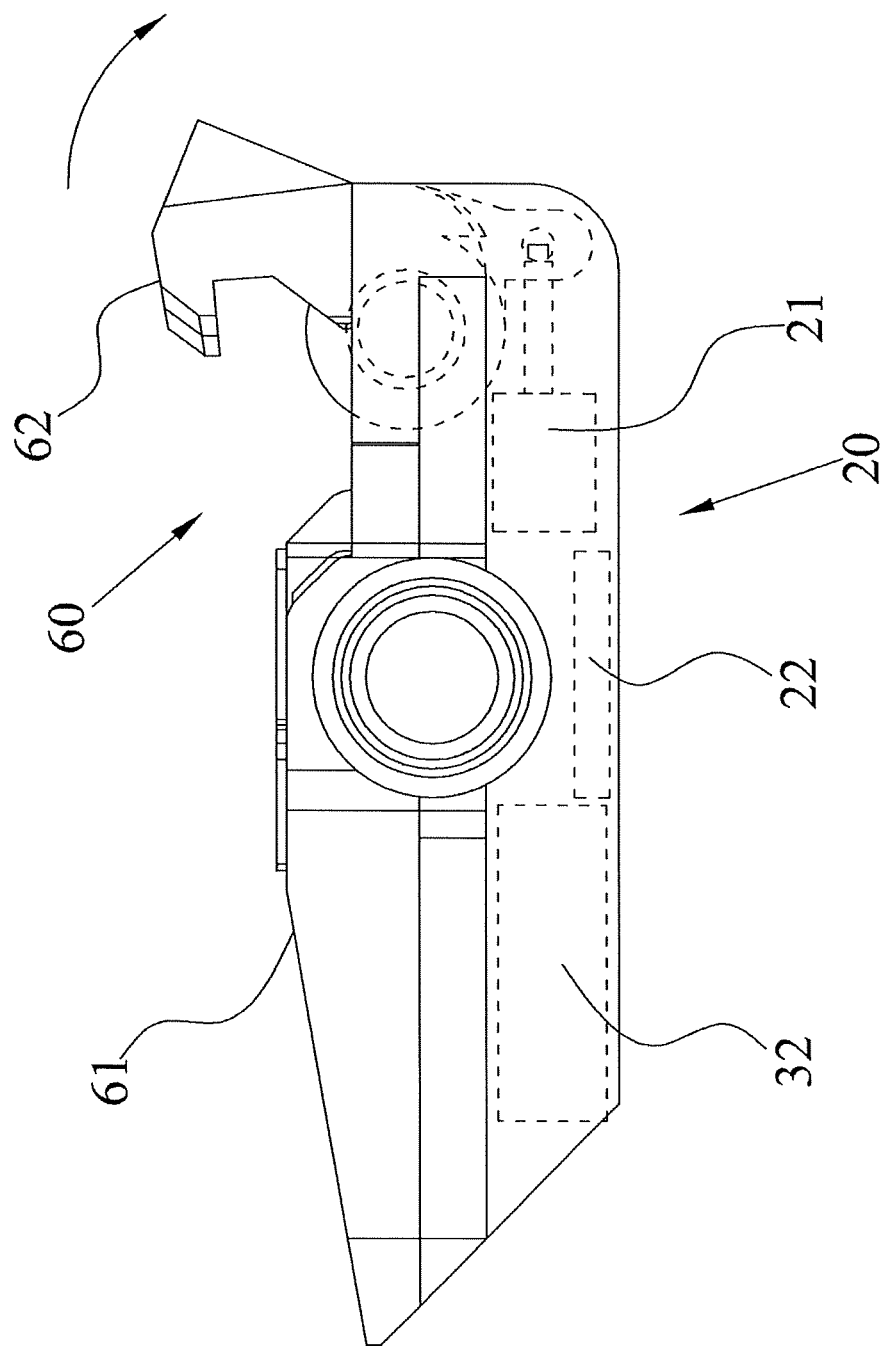
FIG. 4 is a schematic structural view of a pedal module of a cycling shoe fixing device of the present invention.

Please refer to FIGS. 1 to 4, which are block diagram of a cycling shoe fixing device, schematic view of operation of the cycling shoe fixing device, schematic structural view of a brake sensing module, and schematic structural view of pedal module, according to an embodiment of the present invention, respectively.

As shown in figures, the cycling shoe fixing device 1 is applicable to a bicycle 9, and comprises a brake sensing module 10 and a cycling shoes releasing module 20. In an embodiment, the bicycle 9 can be a general bicycle, a road bike, or a mountain bike.

The brake sensing module 10 is disposed inside the brake handle 51 of the bicycle 9. The number of brake handle 51 is usually two, and the two brake handles 51 can be disposed on handlebars of the bicycle 9, and configured to control the rotations of the two wheels (such as a front wheel and a rear wheel) of the bicycle 9, respectively. The brake sensing module 10 comprises a brake sensor 11 and a first wireless transmitter 12. The brake sensor 11 is configured to sense a braking action of the brake handle 51 to generate and transmit a sensing signal 111 to the first wireless transmitter 12. The first wireless transmitter 12 is configured to transmit the sensing signal 111.

Furthermore, the number of the brake sensing module 10 can be one, and the brake sensing module 10 is disposed in one of the brake handles 51; or, the number of the brake sensing module 10 can be two, and the two brake sensing modules 10 are disposed in the two brake handles 51, respectively. Preferably, the brake sensor 11 can be an optical sensor, a pressure sensor, or a physical contact sensor. When the brake sensor 11 is the optical sensor, the brake sensor 11 can sense the signal change caused by the user's action of pressing the brake handle 51, for example, the brake sensor 11 can sense that the light is blocked, the light is not blocked, the light is reflected, or the light is not reflected, so as to generate the sensing signal 111. When the brake sensor 11 is the pressure sensor, the brake sensor 11 can sense the pressure change caused by the user's action of pressing the brake handle, so as to generate the sensing signal 111. When the brake sensor 11 is the physical contact sensor, the brake sensor 11 can sense the signal change caused by the user's action of pressing the brake handle to contact the sensor, so as to generate the sensing signal 111.

On the other hand, the cycling shoes releasing module 20 is disposed inside a pedal module 60 of the bicycle 9. The pedal module 60 corresponds to a cycling shoe A used by the user, and the cycling shoes releasing module 20 comprises a driving unit 21 and a second wireless transmitter 22. The second wireless transmitter 22 can receive the sensing signal 111 transmitted from the first wireless transmitter 12, and transmit the sensing signal 111 to the driving unit 21. The driving unit 21 is connected to an engagement unit 62 of the pedal module 60. Upon receipt of the sensing signal 111, the driving unit 21 can drive the engagement unit 62 to a release location according to the sensing signal 111, so as to make the cycling shoe A separable from the pedal module 60.

Preferably, the driving unit 21 can be a motor. With cooperation between gear components such as spur gear or helical gear, when the shaft of the motor is rotated, the gear is rotated simultaneously, so as to drive the engagement unit 62 to move to the release location.

It is to be noted that the wireless communication between the first wireless transmitter 12 and the second wireless transmitter 22 can be performed by using Bluetooth, RF, and so on.

It is to be noted that when the brake sensor 11 is the pressure sensor, the brake sensor 11 senses the pressure change caused by the user's action of pressing the brake handle, so as to generate different sensing signal 111 according to the intensity of the braking action. As a result, the driving unit 21 can drive the engagement unit 62 according to the intensity of the braking action, that is, that the driving unit 21 drives the engagement unit 62 to the release location according to the sensing signal 111, is not just an on/off operation; and, the intensity of the engagement unit 62 releasing the cycling shoes can be proportional to the intensity of the braking action, so that the elastic force of the clipless pedal can be just slightly reduced in response to the lightly-braking action, and the clipless pedal and the cycling shoe are not completely separated from each other.

In an embodiment, the pedal module 60, which is also called as a clipless pedal, comprises a pedal 61 and an engagement unit 62 (such as a buckle) connected to a spring. The cycling shoes A also includes a fastener. When the fastener of the cycling shoes A is aligned with the engagement unit 62 of the pedal 61 and the user pedals with force, the fastener of the cycling shoes A can be engaged with the engagement unit 62 tightly, so as to achieve the effect that the user cannot take foot off the pedal 61 during riding. Therefore, the forces of pedaling and pulling actions can be integrated to improve riding efficiency; furthermore, the foot is fixed by the cycling shoes A, so that the effect of fixing the user's riding posture upon adjustment before riding can be achieved, and the rider can feel more comfortable and be prevented from sport injury. However, when getting off the bicycle, the user must laterally rotate foot with force to separate the fastener from the pedal 61, but some riders may forget to separate the fastener from the pedal 61 because of unfamiliar to the separation action, or it is too late to separate the fastener from the pedal 61 because of emergency accident, and the danger of falling from the bicycle may occur.

The manner of tightly combining the fastener of the cycling shoes A with the engagement unit 62 is well known for one skilled in the art, so the detailed description is not repeated herein. For the bicycle using the cycling shoe fixing device 1 of the present invention, the manner of tightly combining the fastener of the cycling shoes A with the engagement unit 62 is substantially the same as the conventional art, so the user still can get off the bicycle by using original action (such as rotation) without pressing the brake. Therefore, a beginner, an experienced rider or a professional rider can effortlessly use the cycling shoe fixing device 1 of the present invention, and when the rider wants to stop the bicycle, the rider's the subconscious action of pressing the brake can automatically release the cycling shoes, so as to prevent from risk that the rider takes the cycling shoe off the clipless pedal too late.

In an embodiment, the cycling shoe fixing device can comprise a power supply module 30 electrically connected to the brake sensor 11, the first wireless transmitter 12, the driving unit 21, and the second wireless transmitter 22, and configured to supply power to the brake sensor 11, the first wireless transmitter 12, the driving unit 21, and the second wireless transmitter 22 for operation.

In an embodiment, the power supply module 30 can comprise a first battery unit 31 and a second battery unit 32. The first battery unit 31 is disposed inside the brake handle 51 of the bicycle 9 and electrically connected to the brake sensor 11 and the first wireless transmitter 12. The second battery unit 32 can be disposed inside the pedal 61 of the pedal module 60 of the bicycle 9 and electrically connected to the driving unit 21 and the second wireless transmitter 22.

It is to be noted that each of the first battery unit 31 and the second battery unit 32 can be a general battery, such as lithium battery, zinc manganese battery, and so on; or, each of the first battery unit 31 and the second battery unit 32 can be a rechargeable battery such as Li-ion battery, lead-acid battery, nickel-cadmium battery, and so on. These batteries can be classified into a variety of model batteries, such as AA battery, AAA battery, and so on. In other embodiment, the power supply module 30 also comprise a solar panel, for example, the solar panel can be disposed on a seat tube, a top tube or a down tube of the bicycle, so that the solar panel can directly charge the first battery unit 31 and the second battery unit 32 which is a secondary battery.

The cycling shoe fixing device 1 of the present invention uses the braking action which occurs before the user stops the bicycle, or when the user rides on downhill section, or before accident, and the wireless signal can trigger the driving unit 21 of the pedal 61 to reduce the intensity of the spring of the engagement unit 62, so that the rider can release the engagement state effortlessly by lifting their foot thereof; furthermore, the cycling shoes and the pedal can be combined tightly during riding. As a result, the rider's hand always responds to the brakes first when the user slows down the bicycle, or rides on a downhill section or encounters emergency accident, so sensing device of the cycling shoe fixing device 1 can be disposed on the brake handle, and the sensing signal can be wirelessly transmitted to the receiver on the pedal, to activate the small motor of the pedal to reduce the elastic force of the spring on the clipless pedal, so that the rider can effortlessly separate the cycling shoe from the clipless pedal, thereby preventing from falling.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A cycling shoe fixing device, applicable to a bicycle, and comprising:
    a brake sensing module disposed inside a brake handle of the bicycle, and comprising a brake sensor and a first wireless transmitter, wherein the brake sensor is configured to sense a braking action of the brake handle to generate and transmit a sensing signal to the first wireless transmitter, and the first wireless transmitter is configured to transmit the sensing signal;
    a cycling shoe releasing module disposed inside a pedal module of the bicycle, wherein the pedal module corresponds to a cycling shoe used by a user, and the cycling shoe releasing module comprises a driving unit and a second wireless transmitter, the second wireless transmitter is configured to receive the sensing signal, and transmit the sensing signal to the driving unit, and the driving unit is connected to an engagement unit of the pedal module, and configured to drive the engagement unit to a release location according to the sensing signal, so as to make the cycling shoe separable from the pedal module; and a power supply module electrically connected to the brake sensor, the first wireless transmitter, the driving unit, and the second wireless transmitter, and configured to supply power to the brake sensor, the first wireless transmitter, the driving unit and the second wireless transmitter for operation.

2. The cycling shoe fixing device according to claim 1, wherein the power supply module comprises a first battery unit disposed inside the brake handle of the bicycle and electrically connected to the brake sensor and the first wireless transmitter.

3. The cycling shoe fixing device according to claim 2, wherein the power supply module comprises a second battery unit disposed inside the pedal module of the bicycle and electrically connect the driving unit and the second wireless transmitter.

4. A bicycle, comprising:
a handlebar configured to provide a user with control to allow the bicycle to move straight or to turn;
a brake module comprising two brake handles and at least one brake sensing module, wherein the two brake handles are configured to stop or slow rotations of two wheels of the bicycle, respectively, and the at least one brake sensing module is disposed inside the at least one brake handle, the brake sensing module comprises a brake sensor and a first wireless transmitter, and the brake sensor is configured to sense a braking action of the brake handle to generate and transmit a sensing signal to the first wireless transmitter, and the first wireless transmitter is configured to transmit the sensing signal;

a pedal module driven by the user's stepping action to rotate the two wheels of the bicycle, wherein the pedal module corresponds to a cycling shoe used by the user, comprises a pedal, an engagement unit and a cycling shoe releasing module, the cycling shoe releasing module is disposed inside the pedal of the bicycle, the engagement unit is disposed on the pedal and configured to engage or release the cycling shoe, and the cycling shoe releasing module comprises a driving unit and a second wireless transmitter, and the second wireless transmitter is configured to receive the sensing signal, and transmit the sensing signal to the driving unit, and the driving unit is connected to the engagement unit of the pedal module, and configured to drive the engagement unit to a release location according to the sensing signal, so as to make the cycling shoe separable from the pedal; and a power supply module electrically connected to the brake sensor and the first wireless transmitter, the driving unit, and the second wireless transmitter, and configured to supply power to the brake sensor, the first wireless transmitter, the driving unit, and second wireless transmitter for operation.

5. The bicycle according to claim 4, wherein the power supply module comprises a first battery unit disposed inside the brake handle of the bicycle and electrically connected to the brake sensor and the first wireless transmitter.

6. The bicycle according to claim 5, wherein the power supply module comprises a second battery unit disposed inside a pedal module of the bicycle and electrically connected to the driving unit and the second wireless transmitter.

* * * * *